Sept. 26, 1961 V. E. RIMSHA ET AL 3,001,717
THERMOSTATIC MIXING VALVE
Filed May 10, 1956 4 Sheets-Sheet 1

INVENTORS
VICTOR E. RIMSHA
JAMES A. KOZEL
BY
ATTORNEYS

Sept. 26, 1961 V. E. RIMSHA ET AL 3,001,717
THERMOSTATIC MIXING VALVE
Filed May 10, 1956 4 Sheets-Sheet 2

INVENTORS
VICTOR E. RIMSHA
JAMES A. KOZEL
BY *Bill Sherman, Meroni, Gross & Simpson* ATTORNEYS

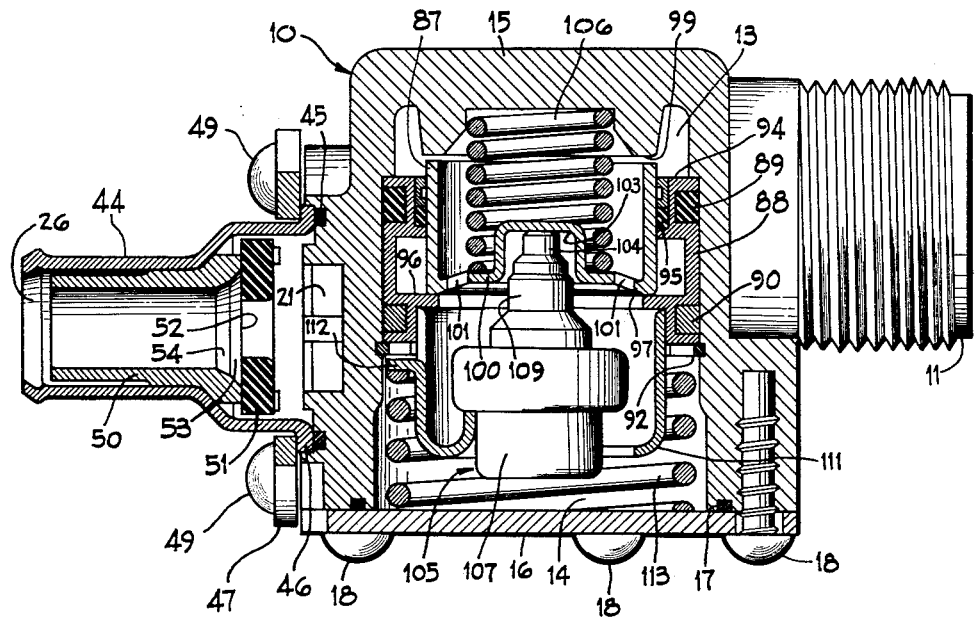

Sept. 26, 1961 V. E. RIMSHA ET AL 3,001,717
THERMOSTATIC MIXING VALVE
Filed May 10, 1956 4 Sheets-Sheet 4

INVENTORS
VICTOR E. RIMSHA
JAMES A. KOZEL
BY
ATTORNEYS

United States Patent Office 3,001,717
Patented Sept. 26, 1961

3,001,717
THERMOSTATIC MIXING VALVE
Victor E. Rimsha and James E. Kozel, Chicago, Ill., assignors to The Dole Valve Company, Chicago, Ill., a corporation of Illinois
Filed May 10, 1956, Ser. No. 584,092
1 Claim. (Cl. 236—12)

This invention relates to improvements in thermostatically controlled fluid mixing valves for delivering hot water, cold water or tempered water at various intermediate temperatures between the temperature of the hot and the cold water.

A principal object of the invention is to provide a new and improved form of thermostatically controlled valve for delivering hot and cold water at the temperature of the water entering the valve, and for delivering a tempered water under thermostatic control or mixed with the hot or cold water.

Another object of the invention is to provide a solenoid controlled valve particularly adapted for combined washing and drying machines and the like, for supplying hot or tempered water for clothes washing and rinsing purposes and cold water for condensing the moisture removed from the clothes during the drying operation.

A still further object of the invention is to provide an improved form of mixing valve having hot and cold water inlets leading directly to a mixing chamber and having a common outlet for delivering either hot water, tempered water under thermostatic control, cold water or mixtures of hot water or cold water with tempered water under the cyclic control of a washing machine and the like.

Still another object of the invention is to provide an efficient form of mixing valve having a central mixing chamber with hot and cold water inlets leading into the mixing chamber in which water is metered thereto by a thermostatically controlled valve element and in which the valve has a common outlet passageway, and three independently operated solenoid controlled valves control the flow of water through the outlet, one controlling the discharge of tempered water from the mixing chamber, a second controlling the by-pass of hot water from the hot water inlet around the mixing chamber for discharge through the outlet or mixture with tempered water, and a third controlling the by-pass of cold water from the cold water inlet around the mixing chamber for discharge through the outlet or for mixture with tempered water in the outlet.

These and other objects of the invention will appear from time to time as the following specification proceeds and with reference to the accompanying drawings wherein:

FIGURE 5 is a sectional view taken substantially along line V—V of FIGURE 1, in order to show the mixing chamber and thermostatic valve therein;

FIGURE 6 is a fragmentary sectional view taken through the cold water inlet;

FIGURE 7 is a fragmentary sectional view taken through the hot water inlet;

Figures 1, 2, 3:
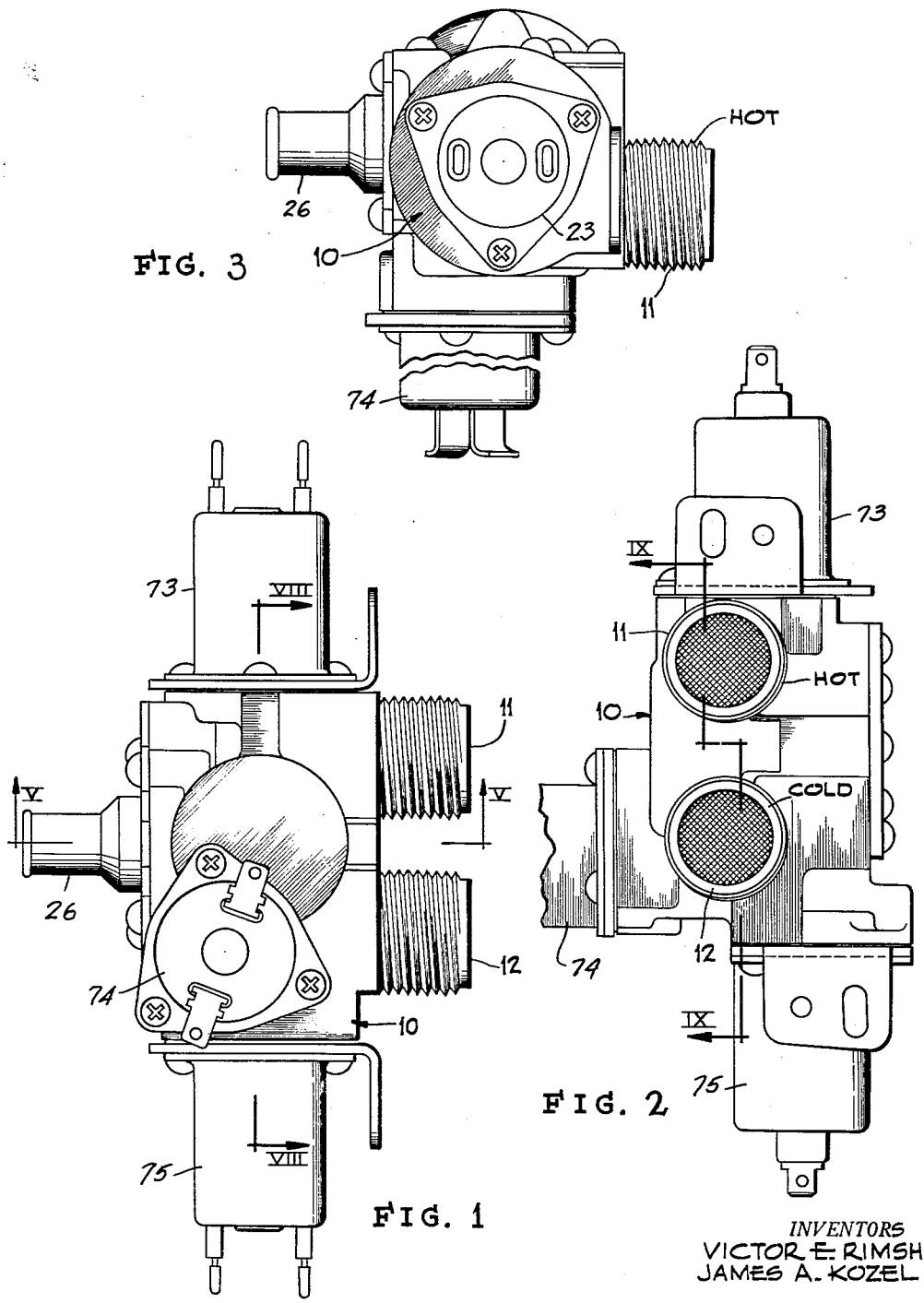
FIGURE 1 is a view in side elevation of a mixing valve constructed in accordance with the invention.
FIGURE 2 is a front view of the valve shown in FIGURE 1.
FIGURE 3 is a top plan view of the valve shown in FIGURES 1 and 2.
Figure 8:
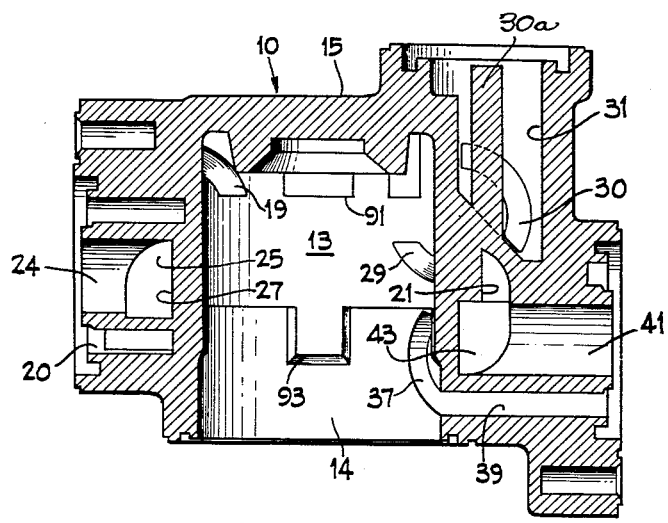
Figure 9:
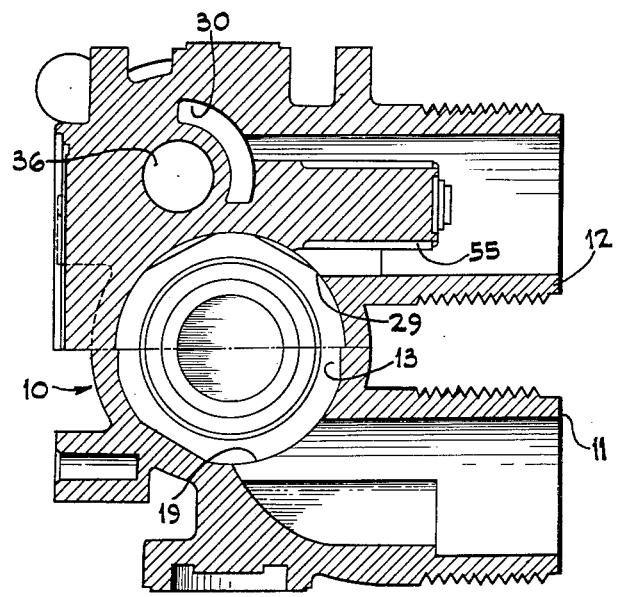

FIGURE 8 is a fragmentary sectional view taken substantially along line VIII—VIII of FIGURE 1 with the solenoid controlled valves and the thermostatic valve removed; and FIGURE 9 is a fragmentary sectional view taken substantially along line IX—IX of FIGURE 2 with certain parts removed; and FIGURE 10 is a diagrammatic representation of the fluid flow paths through the valve constructed in accordance with the invention.

In the embodiment of the invention illustrated in the drawings, the valve is shown as comprising a valve body 10 having spaced hot and cold water inlets 11 and 12, respectively, leading into a metering chamber 13, having a central aligned mixing chamber 14 in direct communication with one end thereof.

The valve body may be molded from one of many of the well known forms of thermoplastic materials. One such material, which has been found to be extremely satisfactory for such a valve, is a "nylon" thermoplastic material, which may readily be molded to the desired form and which is unaffected by the heat of the hot water.

The metering chamber 13 is shown as being closed at one end by an end wall 15 of the valve body. The communicating mixing chamber 14 is shown as being closed by a cover 16 sealed to the valve body by a gasket 17. The cover 16 is retained to the valve body in engagement with said gasket by machine screws 18 threaded in the valve body. The machine screws 18 are shown in FIGURE 5 as being self-tapping screws.

The hot water inlet 11 is shown in FIGURES 8 and 9 as leading directly to the metering chamber and communicating therewith through a port 19. The hot water inlet also communicates with an annular passageway 20 opening to an end of the valve body and closed by a pressure operated solenoid controlled diaphragm valve 23. The diaphragm valve 23 controls the flow of hot water from the annular passageway 20 through a central port 24 concentric with said annular passageway. A port 25 in the wall of the portion of the valve body defining the port 24 communicates with an outlet 26 from the valve through a passageway 21 leading along the outside of a wall 27 for the metering and mixing chambers 13 and 14 (see FIGURE 5).

Figure 4:
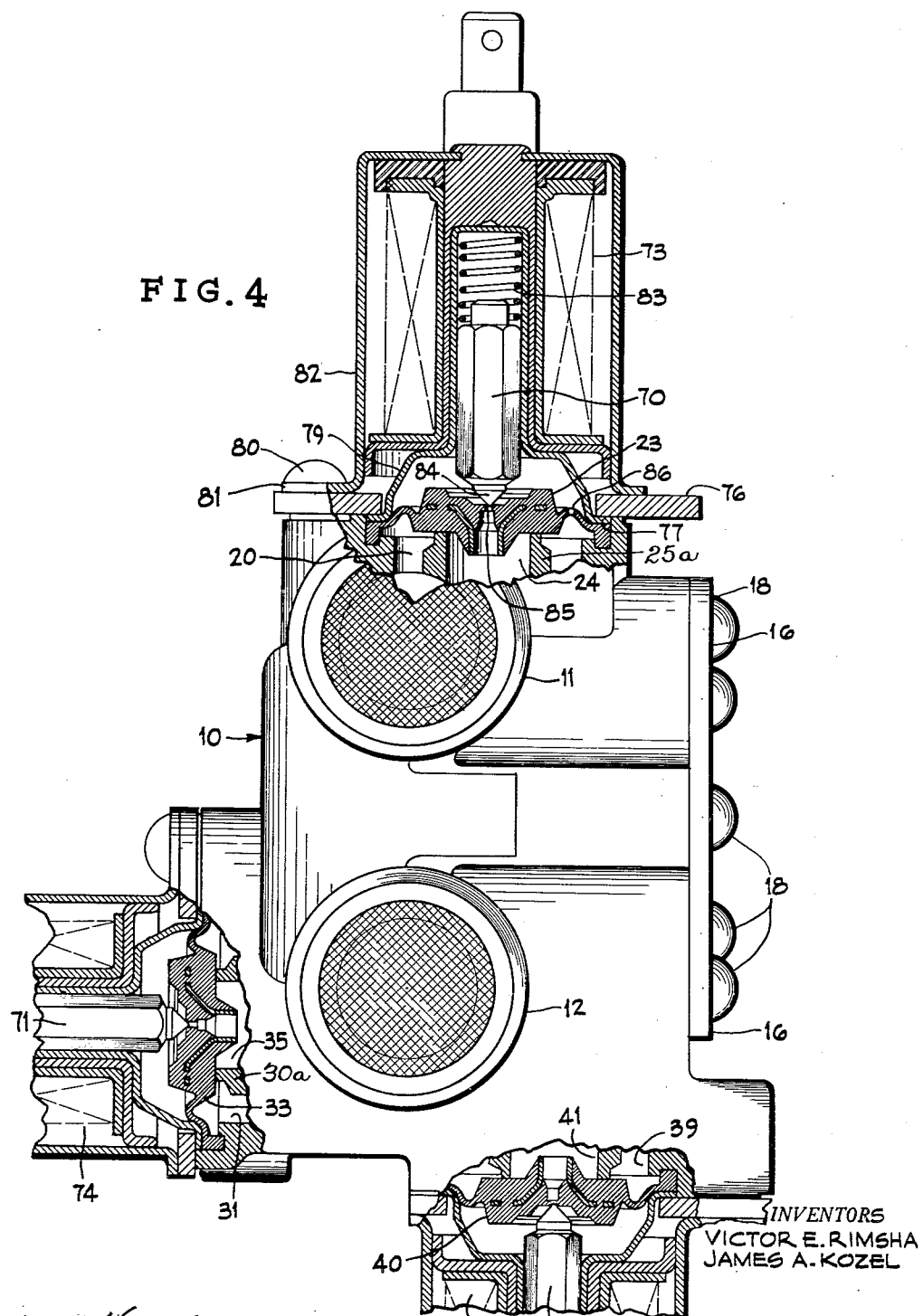
FIGURE 4 is an enlarged front end view of the valve with certain parts broken away and certain other parts shown in section in order to illustrate the solenoid controlled pressure operated valves controlling the flow of water at the various selected temperatures through the outlet from the valve.

The cold water inlet 12 communicates directly with the metering chamber 13 through a port 29 leading directly into said mixing chamber from the inlet 12 in vertically spaced relation with respect to the hot water inlet port 19. The cold water inlet also communicates with a passageway 30 in the valve body leading to an annular passageway 31 opening to the end of the valve body and closed by a pressure operated solenoid controlled diaphragm valve 33. An upstanding cylindrical wall 30a is formed concentrically with the annular passageway 31 and its inner surface defines a port 35 in the same manner that the port 25 is defined by a cylindrical upstanding wall 25a. However, in FIGURE 8, the wall 30a appears only as an upstanding post since the section line VIII—VIII is taken through only a small segment of the wall. The wall 30a is better shown in FIGURE 4. The diaphragm valve 33 closes the end of the annular passageway 31 and controls the flow of cold water through the port 35 communicating at its inner end with a passageway 36 having communication with the outlet passageway 21 along the outside of the wall 27 of the metering chamber 13 discharging through the outlet 26.

The mixing chamber 14 has a port 37 in the wall thereof, having communication with an annular passageway 39 opening to the opposite side of the valve body from the annular passageway 20 and closed by a solenoid controlled pressure operated diaphragm valve 40. When the diaphragm valve is open, tempered water will flow through a central port 41 communicating with a port 43 leading to the passageway 21 leading around the outside of the wall 27 and having communication with the outlet 26, for discharging tempered water through said outlet.

The outlet 26 is shown in FIGURE 5 as being in the form of a metal fitting 44 sealed to the opposite wall of the valve body 10 from the inlets 11 and 12 by a seal 45 recessed within the wall of the valve body 10. The fitting 44 has a flanged portion 46 abutting the seal 45 and retained in sealing engagement therewith by a yoke 47 engaging the outside of the flanged portion 46, and by machine screws 49, which may be self-tapping screws extending through the yoke 47 and threaded within the valve body 10.

The fitting 44 is shown as having a generally tubular seating and passageway member 50 extending along the outlet 26 of said fitting and forming a seat for a resilient flow control device 51 for maintaining a substantially uniform rate of flow through the outlet 26 regardless of variations in inlet pressure of the fluid entering the valve body through the inlets 11 and 12, as in Patent No. 2,454,929 which issued to Leslie A. Kempton on November 30, 1948. The seating and passageway member 50 is provided with a flat annular inner face 52 on which the flow control annulus 51 is seated, which terminates into two adjoining frusto-conical surfaces 53 and 54 into which the annulus flow control device 51 may flex as the pressure acting thereagainst increases, to reduce the delivery area of the orifice through said annulus upon increases in pressure of the fluid flowing through the outlet 26.

The cold water inlet 12, as shown in FIGURE 6, has a boss 55 extending therealong and spaced radially inwardly from the wall thereof. The boss 55 terminates short of the inlet end of the inlet 12 and has an annular recess 56 formed therein forming a seat for a resilient check valve 57, extending outwardly from said boss to the wall of the cold water inlet. The check valve 57 is abutted at its outer face by an apertured washer 59 retained in position on the boss 55 by a self-tapping screw 60 threaded therein. Water entering the inlet thus flows through the apertures of the apertured washer 59 and flexes the check valve inwardly along the boss 55 to accommodate the flow of fluid along the inlet passageway, but to block the back flow of fluid out through the inlet and to prevent the mixing of the mixed water with the cold water in the inlet. A screen 61, herein shown as being generally hat shaped in form, is seated in the inlet 12 against the washer 59.

The hot water inlet 11 likewise has a screen 63 seated against a washer 64, abutting a shouldered portion 65 of the hot water inlet 11.

The pressure operated solenoid controlled diaphragm valves 23, 33 and 40 are independently operable to control the flow of hot, cold and tempered water respectively through the passage 21 and outlet 26. Said valves are controlled by armatures 70, 71 and 72 of solenoids 73, 74 and 75 respectively, and are each of the same construction and of a well known form. The hot water diaphragm valve 23, therefore, need only be described herein.

The diaphragm valve 23 is shown as being retained in sealing engagement with the open end of the valve body 10 at its periphery by a yoke 76 abutting an outer flanged portion 77 of an end cap and guide 79, and pressing said flange into engagement with the outer marginal portion of the diaphragm valve 23. Self-tapping screws 80 extending through a flanged portion 81 of a casing 82 for the solenoid, and through the yoke 76 are provided to retain the solenoid 82 to the end of the valve body and to retain the end cap 79 in sealing engagement with the marginal portion of the diaphragm valve 23. The end cap 79 forms a guide for the armature 70. A spring 83 seated within the end cap 79 serves to bias a conical end portion 84 of the armature 70 into engagement with a port 85 leading through the center of the diaphragm 23.

The diaphragm 23 has a bleeder passageway 86 leading therethrough to pass water from one side of the diaphragm to the other and create a pressure differential on both sides of the diaphragm when the orifice 85 is closed by the conical end portion 84 of the armature 70, and thus to maintain the valve closed by the pressure of the water acting on the outer face thereof. Upon energization of the solenoid 73, the armature 70 will move out of engagement with the central orifice 85, relieving pressure from the outer side of the diaphragm 18 and effect the opening of the valve 23 by the pressure of fluid on the under side thereof. When the diaphragm valve 23 is open, upon energization of the solenoid 73, as previously described, fluid under pressure will flow from the annular passageway 20 through the port 24 and passageways 25 and 21 to supply hot water to a washing machine or like device connected with the outlet 26, or to mix with tempered water flowing from the valve 40 through the passageway 21.

In a like manner, when the solenoid 74 is energized to withdraw the armature 71 from the valve 33, the valve 33 will open and fluid under pressure will pass through the annular passageway 31 and out the port 35 and the passageway 36 through the outlet 26, to supply cold water for condensing purposes or to mix with tempered water flowing from the valve 40 through the passageway 21.

Upon energization of the solenoid 75 and withdrawal of the armature 72 from the diaphragm valve 40, mixed water will flow from the mixing chamber 14 out through the port 39 and through the port 41 and passageway 43 through the outlet 26 to provide tempered water for washing or rinsing purposes.

A hollow piston valve 87 is provided to meter hot and cold water into the metering chamber 13 and mixing chamber 14 through the inlet ports 19 and 29, respectively, leading through the wall of the metering chamber 13 and having direct communication with the respective hot and cold water inlets 11 and 12.

The piston valve 87 is guided within a generally cylindrical insert 88 extending along the wall of the metering chamber 13 and apertured to accommodate the flow of cold water therethrough from the port 29. The insert 88 is sealed to the wall of the chamber 13 by spaced seals 89 and 90 and is retained in engagement with inwardly extending projections 91, projecting inwardly from the wall of the chamber 13 by a retainer ring 92 which may be a snap ring snapped in the wall of the chamber 13 into engagement with the outer end of the insert 88. Splines 93 are provided to retain the insert 88 from turning movement within the chamber 13. The insert 88 is also provided with an inwardly extending flanged portion 94 engaging the wall of a piston valve 87 and sealed thereto as by a seal 95. The insert 88 is likewise provided with an annular shoulder 96 extending inwardly therefrom in spaced relation with respect to the flange 94, and forming a seat for an end 97 of the piston valve 87. The opposite end of the piston valve is seated against an inwardly extending annular face 99 of the end wall 15 of the metering chamber 13, to block the passage of hot water into the mixing chamber 14.

The piston valve 87 is provided with a lower wall 100 having flow passageways 101 leading therethrough and having a central dome like portion 103 engaged by a piston 104 of a thermal element 105. The dome like portion 103 is biased into engagement with the piston 104 by a spring 106, seated within the annular face 99 at one end and in the wall 100 of the piston 87 at its opposite end.

The thermal element 105 is shown as being of the so-called power type of thermal element wherein a fusible thermally expansible material contained within a casing 107 of the thermal element extends the piston 104 from a cylinder 109 of the thermal element as the temperature of water in the mixing chamber 14 approaches the fusion point of the thermally extensible material, as shown and described in Patent No. 2,368,181 which issued to Sergius Vernet on January 30, 1945 and forms no part of our present invention so is not herein shown or described further.

The thermal element 105 is seated in a cage 111 slidably guided within the insert 88 and provided with spaced ears or lugs 112 forming a seat for an overtravel spring 113 seated at its opposite end in the closure plate 16 for the mixing chamber 14. The overtravel spring 113 is sufficiently strong to normally act as a solid member but to yield upon excessive temperature conditions to prevent damage to the thermal element, the valve 87 and the valve casing 10.

It will be noted that the hot water inlet passage 19 is to one side of the seal 95 while the cold water inlet passage 29 is to the opposite side of said seal and above the annular seating surface 96 of the retainer 88. Thus when the valve 87 is in the position shown in FIGURE 5, hot water will enter through the port or passageway 19 and pass through the apertured portions 101 of the piston valve 87 into the mixing chamber 14. As the temperature of the water in the mixing chamber increases to a point which will cause fusion of the fusible thermally expansible material within the casing 105, the piston 104 will be extended from the cylinder 109 to admit cold water through the port 29 into the mixing chamber, to mix with the hot water therein and temper the same, for supply to a washing machine or like device through the tempered water valve 40, as previously described.

It may be seen from the foregoing that a novel and improved form of mixing valve has been provided particularly adapted for use with combined washing and drying machines for supplying hot or mixed water at various temperatures for washing and rinsing purposes and supplying cold water for condensing purposes during the drying operation.

It may further be seen that the control of the hot, cold and mixed water is through independently operated separate pressure operated solenoid control valves, discharging to a common passageway forming a mixing chamber in addition to the thermostatically controlled mixing chamber when required, and that a uniform delivery rate of the water through the outlet of the valve and mixing in the outlet passageway is assured by the annular flow control device 51, which is effective throughout a wide range of pressure variations.

It may further be seen that in order to attain the delivery of water at various temperatures through the outlet of the valve by the use of a single valve body, without unduly increasing the size of the valve, that a novel system of passageways and closure means for the end portions of the valve body has been attained, resulting in an efficient mixing and tempering of the hot and cold water as well as delivery of water at the required temperature without interference by the individual valves, selectively operable independently of each other to deliver water at the temperature selected.

It will be understood that various modifications and variations of the present invention may be effected without departing from the spirit and scope of the novel concepts thereof.

We claim as our invention:

In a mixing valve for delivering fluid at various selected temperatures, a one-piece molded valve body having a generally cylindrical mixing chamber therein opening to a first face of said valve body and axially extending substantially therethrough closed at its inner end by a second face of said valve body, hot and cold fluid inlets leading into said valve body through a third face thereof, an outlet from said valve body through a fourth face thereof opposite said third face, passageways in said valve body from said hot and cold water inlets respectively communicating with said mixing chamber through ports in the cylindrical wall thereof spaced from each other circumferentially and axially of said mixing chamber, a passageway in said valve body from said cold fluid inlet opening to said second face of said valve body, a passageway in said valve body from said hot fluid inlet opening to a fifth face of said valve body, a passageway in said valve body leading from a port in the cylindrical wall of said mixing chamber and opening to a sixth face of said valve body opposite said fifth face, a hollow piston valve in said mixing chamber having annular faces at opposite ends thereof, said valve body having an annular hot fluid valve seat at the inner end of said mixing chamber for cooperation with the valve face on one end of said piston valve to control flow from said hot fluid inlet to said mixing chamber, a generally cylindrical insert in said mixing chamber providing an annular cold fluid valve seat spaced from said hot fluid valve seat a greater distance than the length of said piston valve for cooperation with the valve face on the other end of said piston valve to control flow from said cold fluid inlet to said mixing chamber, a spring seated on said valve body at the inner end of said mixing chamber within said hot fluid valve seat and operatively associated with said piston valve to bias said piston valve away from said hot fluid valve seat, a thermally responsive element in said mixing chamber in sensing relation with mixed fluid therein and operatively associated with said piston valve to move said piston valve toward said hot fluid valve seat upon predetermined increases in the temperature of the mixed fluid, a cover plate secured to said valve body on said first face thereof for closing the outer end of said mixing chamber, the axis of said mixing chamber extending parallel to said fifth and sixth faces of said valve body and perpendicular to a plane containing the axis of said inlets, ports in said valve body communicating with said outlet and respectively opening to said second, fifth, and sixth faces of said valve body, and independently operable solenoid control pressure operated diaphragm valves covering the ends of said passageways and said ports opening to said second, fifth, and sixth faces and operable singly and in combination to supply fluid at various selected temperatures through said outlet.

References Cited in the file of this patent

UNITED STATES PATENTS

| | | |
|---|---|---|
| 2,159,033 | Leonard | May 23, 1939 |
| 2,453,409 | Chace | Nov. 9, 1948 |
| 2,553,769 | Kempton | May 22, 1951 |
| 2,620,134 | Obermaier | Dec. 2, 1952 |
| 2,712,324 | Lund | July 5, 1955 |
| 2,830,765 | Beller | Apr. 15, 1958 |